Feb. 28, 1967 F. E. SMITHBERG ETAL 3,306,989
MAGNETIC RECORD BELT WITH MEANS FOR ALIGNING BELT
Filed May 6, 1963
9 Sheets-Sheet 1

INVENTORS:
Floyd E. Smithberg
Michael C. Supitilov
BY Robert L. Kahn ATTY.

Feb. 28, 1967  F. E. SMITHBERG ETAL  3,306,989
MAGNETIC RECORD BELT WITH MEANS FOR ALIGNING BELT
Filed May 6, 1963  9 Sheets-Sheet 3

INVENTORS:
Floyd E. Smithberg,
Michael C. Supititov
BY ROBERT L. KAHN ATTY.

Feb. 28, 1967  F. E. SMITHBERG ETAL  3,306,989
MAGNETIC RECORD BELT WITH MEANS FOR ALIGNING BELT
Filed May 6, 1963  9 Sheets-Sheet 4

INVENTORS:
Floyd E. Smithberg
Michael C. Supitilov
BY Robert L. Kahn ATTY.

Feb. 28, 1967    F. E. SMITHBERG ETAL    3,306,989
MAGNETIC RECORD BELT WITH MEANS FOR ALIGNING BELT
Filed May 6, 1963                               9 Sheets-Sheet 5

INVENTORS:
Floyd E. Smithberg
Michael C. Supitilov
BY Robert L. Kahn ATTY.

INVENTORS:
Floyd E. Smithberg
Michael C. Supitilov
BY Robert L. Kahn ATTY.

Feb. 28, 1967 F. E. SMITHBERG ETAL 3,306,536
MAGNETIC RECORD BELT WITH MEANS FOR ALIGNING BELT
Filed May 6, 1963 9 Sheets-Sheet 8

INVENTORS:
Floyd E. Smithberg
Michael C. Supitilov
BY Robert L. Kahn
ATTY.

FIG. 19

Feb. 28, 1967 — F. E. SMITHBERG ETAL — 3,306,989
MAGNETIC RECORD BELT WITH MEANS FOR ALIGNING BELT
Filed May 6, 1963 — 9 Sheets-Sheet 9

INVENTORS:
Floyd E. Smithberg
Michael C. Supitilov
BY Robert L. Kahn ATTY.

United States Patent Office 3,306,989
Patented Feb. 28, 1967

3,306,989
MAGNETIC RECORD BELT WITH MEANS
FOR ALIGNING BELT
Floyd E. Smithberg and Michael C. Supitilov, St. Charles, Ill., assignors to Du Kane Corporation, St. Charles, Ill., a corporation of Delaware
Filed May 6, 1963, Ser. No. 278,093
2 Claims. (Cl. 179—100.2)

This invention relates to a machine for magnetically recording and/or reproducing sound on an endless magnetizable record belt having a pre-grooved track on the belt for physically locating a sound track. A machine of this character will have a transducer which is freely movable laterally of the belt for cooperation with the groove for tracking. Such a machine has a distinct advantage in that no lead screw is necessary for tracking movement of the transducer. By pre-grooving the endless record belt, the location of a sound track is predetermined. This is highly advantageous in that dimensional changes of record belts in response to temperature, humidity, as well as tolerances in belt manufacture, do not affect tracking. In addition, no great precision on the part of the machine will be required. However, it is important that a belt should remain properly seated for cooperation at all times with a transducer.

In a practical machine using a pre-grooved belt, the depth and width of a groove will be quite small. As an example, the pitch of such a groove may be about 50 threads per inch of belt width, while the depth of the groove may be of the order of about .010″. The groove width may be about .015″. It is well known that for satisfactory transducer operation, magnetizable member must ride on the belt sound track and this member must have some length along the direction of the track. This requirement is different from that of a pointed stylus transducer. If the sound track is located at the bottom of a groove, then accurate alignment of the transducer lamination which functions also as a tracking member must be maintained with the groove to avoid binding. If the sound track is on a land between adjacent grooves, a tracking member riding in the groove will be necessary, and such tracking member should preferably extend for a short distance along the length of a groove to maintain the transducer true.

Irrespective of the location of the sound track on the belt, it is necessary to provide accurate tracking and permit the transducer to move laterally across the belt freely for proper tracking. This involves not only control of transducer travel, but also control over the belt positioning.

Tracking in a machine as described above is aggravated by two factors. One is the desirability in such a record of having a record belt move in forward or reverse direction while tracking the transducer. The other is that plastic record belts having a magnetizable coating on the surface thereof cannot be manufactured to close dimensional tolerances except for thickness. A practical record belt will have a length of about 14 or 15 inches measured circumferentially and a width of about 4 inches from edge to edge across the belt. Such belts in the course of manufacture or handling, or both, depart from dimensional perfection by having the belt length along one edge measurably different from the belt length along the other edge. This will not only vary among belts, but will change in the same belt during use.

The lack of precise uniformity of belt edge length poses a problem in connection with belt drive. The requirement for belt drive in forward or reverse aggravates this problem. In order for a transducer to work with a record belt, it is necessary that the belt be in tension. In a machine of the type where two spaced mandrels are provided for belt support and tensioning, some practical problems have arisen. These problems result from the well known tendency of a belt to shift laterally. For example, a simple flat belt for transmitting power from a cylindrical driving pulley to a cylindrical driven pulley will tend to work itself off a pulley. This tendency is overcome by crowning both pulleys along the centers. Such a recourse is not available in a magnetic recording and reproducing machine because the transducer must be able to travel laterally across the record belt in a flat plane.

In accordance with the present invention, a machine embodying the present invention has two laterally offset mandrels, with the axes of the two mandrels lying in one plane. The driver mandrel is of the cantilever type having one end supported and provided with power means for turning the mandrel at the supported end. The other end of the driver mandrel is free to receive a record belt for mounting or removal. A driven or follower mandrel is mounted so that its axis is movable within the plane containing the two axes. The follower mandrel has one free end opposite the driver free end. The mounting means for the follower mandrel is disposed in such a way as to permit the record belt to be moved on or off of the two mandrels. Means are provided for biasing the follower mandrel support means so that the axis of the follower mandrel tends to be non-parallel to the driver mandrel axis. Thus there is a tendency for the separation between the two mandrel axes to be greater at one end of a mandrel as compared to the other end of the mandrel and consequently the tension along one belt edge tends to be different from the other belt edge. As the result of such a belt tensioning bias, a record belt will tend to move laterally from those mandrel ends where the greater tension exists. Means are provided for limiting such lateral travel of the belt.

Mechanically, the simplest arrangement is to arrange the bias so that the follower mandrel will have the larger separation between axes at the unsupported end of the driver mandrel, thus creating a tendency for a record belt to move toward what may be designated as the inner mandrel ends. Such an arrangement permits a record belt to locate itself in proper final lateral position on the mandrels (if the original belt placement was improper) and to maintain this location at all times, irrespective of the direction of belt drive. This desirable belt action will occur within tolerable limits of dimensional variations between the two edges of a belt. This is true whether the inside edge of the belt is somewhat larger or smaller than the outside edge of the belt. By "inside edge of the belt" is meant the edge which will first go on to the mandrels and be nearest the inside ends of the mandrels. It is of course possible to position the belts without regard to either inside or outside edge, but this will generally cause some confusion in actual use.

Ancillary to the problem of maintaining the proper position of a record belt laterally of the support mandrels is the problem of belt placement on or removal from the mandrels. It is desirable to provide simple means permitting such belt changes. The invention solves this problem in a simple manner. The follower mandrel is movable laterally over a range great enough to provide belt placement on or removed from the mandrels as one possibility and belt tensioning as the other possibility. The belt tensioning is applied unsymmetrically in such a manner as to create the bias toward a non-parallel mandrel axes arrangement previously referred to.

In addition to the problem of belt handling, a machine for magnetically recording or reproducing sound should have fast start and stop characteristics, particularly if the intended use of such a machine is in connection with dictating. Because the record belt handling mechanism embodying the present invention requires that one mandrel must always be the driver and since the direction of drive must be reversible, problems relating to the power drive result. A complete machine embodying the present invention relating to record belt handling includes novel clutch means for controlling the direction and application of rotary power to the drive mandrel for moving the record belt. The new clutch means involves simple mechanical elements which cooperate with a wheel whereby a forward or reverse power drive to the driver mandrel is obtained. The clutch construction makes it possible to obtain a change in the speed of mandrel rotation with reversal of drive. Consequently, a machine embodying the new record belt driving means can have the record belt driven at one speed in forward direction and at a higher speed in reverse direction, this ratio being desirable.

In addition to the above advantages incident to the record belt handling and driving, the new machine as hereinafter disclosed includes push button controls with suitable mechanical and electrical interlocks to facilitate proper operation of the machine. Insofar as a finished machine is concerned, the new record belt handling means makes possible the design and manufacture of a machine which has a relatively small depth as compared to the length and width of the entire machine, this generally being desirable for portability.

An added advantageous feature of the new machine resides in a marker mechanism for marking a strip of paper to show errors, etc., recorded on a record belt. Such a marker mechanism travels with a transducer laterally of the record belt. It is desirable, therefore, that a marker mechanism design be integrated into the overall design of a magnetic recording and reproducing machine.

Other desirable features of the new machine include certain electrical switching features wherein the clutch mechanism and electrical switches are mechanically interrelated. In forward direction of record drive, electrical switching activates recording or reproducing circuits, while in the reverse direction of record travel, electrical switching provides for having the motor speed at a maximum value in the event that the machine has been operating in the one direction for conventional belt drive at less than maximum speed. An additional feature is a simple electrically controlled marker mechanism which provides for remote control thereof and improved alarm means for monitoring the operation of the machine to insure that a record belt is present and properly positioned and to indicate when the transducer has reached the end of a record.

In order that the invention may be understood, it will now be disclosed in connection with drawings wherein.

INTRODUCTION

The new machine generally comprises belt driving means which includes driving means beginning with an electric motor and ending with a pair of mandrels carrying the record belt; transducer supporting means which include a transducer and the incidental mechanical means for insuring that the transducer is satisfactorily supported and controlled; remote controlled marker means for operating on a paper slip to call attention to errors, etc., at predetermined parts of a particular record belt; and interlocking control means for starting, stopping and controlling the operation of the machine generally. The entire machine is mounted upon a suitable base, indicated generally by 10.

CLUTCH SYSTEM (FIGS. 2 TO 7 INCLUSIVE)

The belt drive means includes electric motor 12 having drive shaft 14. Electric motor 12 runs in one direction only and may be any one of a number of types available on the market. The electric motor is preferably of the alternating current type and may be of induction type adapted for one or two-phase operation. The motor runs at a reasonably constant speed under load and is of the type which is self-starting. As will be explained later in connection with the electrical circuits, motor 12 will have some speed control through a rheostat, so that in practice the motor may run at speed lower than maximum during recording or reproduction. Motor 12 is supported from suitable bolts carried by motor plate 15 rigidly supported on base 10 and extending upwardly therefrom. Motor plate 15 (FIGURES 3 and 4) carries rigidly attached thereto stud 17 extending outwardly from the motor plate away from the motor. Disposed on stud 17 are bushings 18 and 19 for providing accurate bearing surfaces. Bushings 18 and 19 may be of metal impregnated with graphite for providing permanent lubrication or may have any desired construction, and may be of any desired material such as, for example, nylon, for providing a good bearing support. Rotatively disposed about bushings 18 and 19 is pulley 20 having hub 21 and hub sleeve 22. Pulley 20 has radial portion 23 extending from hub 21 and carries at the outside thereof flange 24. As will be shown, outer surface 25 of hub 21 and inner surface 24a of flange 24 are used respectively as driving surfaces for driving pulley 20 in forward or reverse direction, as desired, while the motor shaft turns in the same direction at all times. This is accomplished by the following means.

Figures 3, 3A, 4:
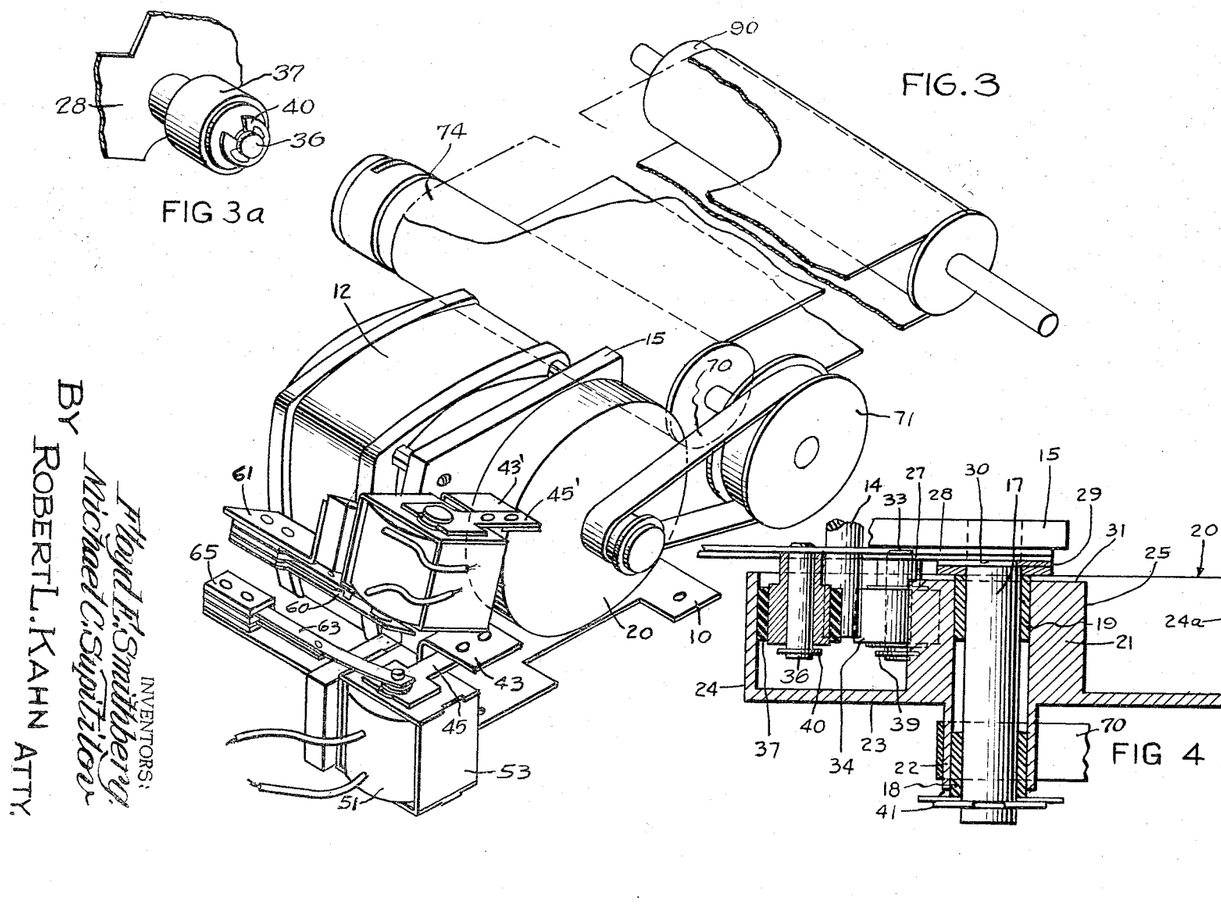
FIGURE 3 is a perspective view of the motor drive for the record belt, together with the clutch control.
FIGURE 3A is a detail illustrating the mounting of a drive pulley.
FIGURE 4 is a section on line 4—4 of FIGURE 3.
Figure 5:
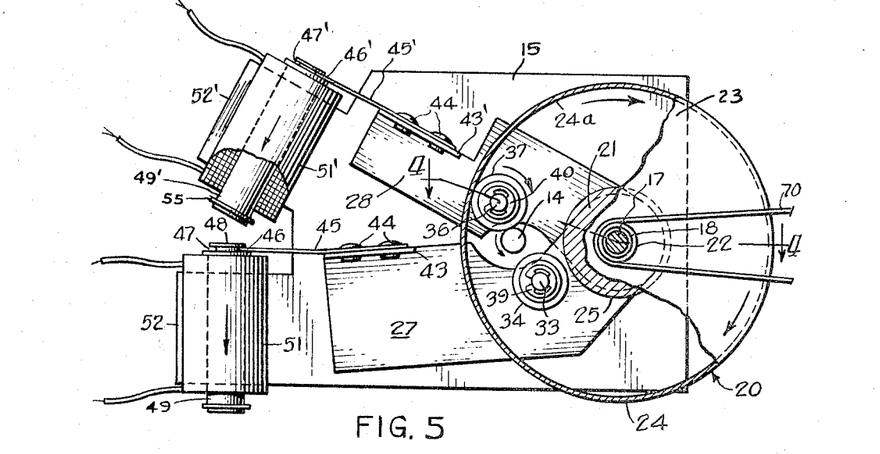
FIGURES 5 and 6 are views illustrating the position of the clutch for forward and reverse record belt drive respectively, the clearances for movement of the idler wheels being exaggerated.
Figure 6:
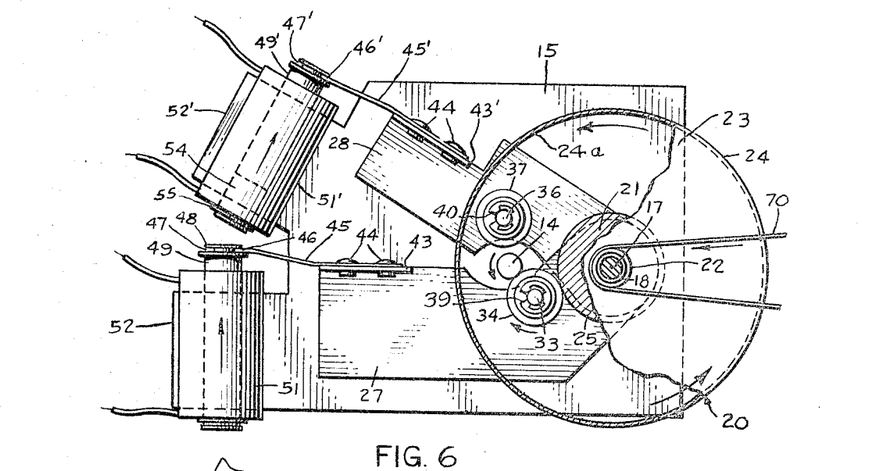
Figure 7:
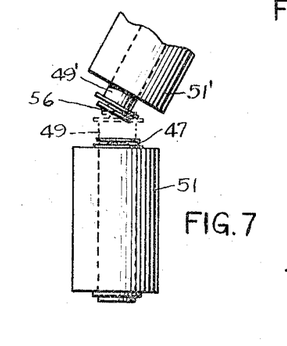
FIGURE 7 is a detail illustrating the relative position of the clutch control solenoids.
Figure 8:
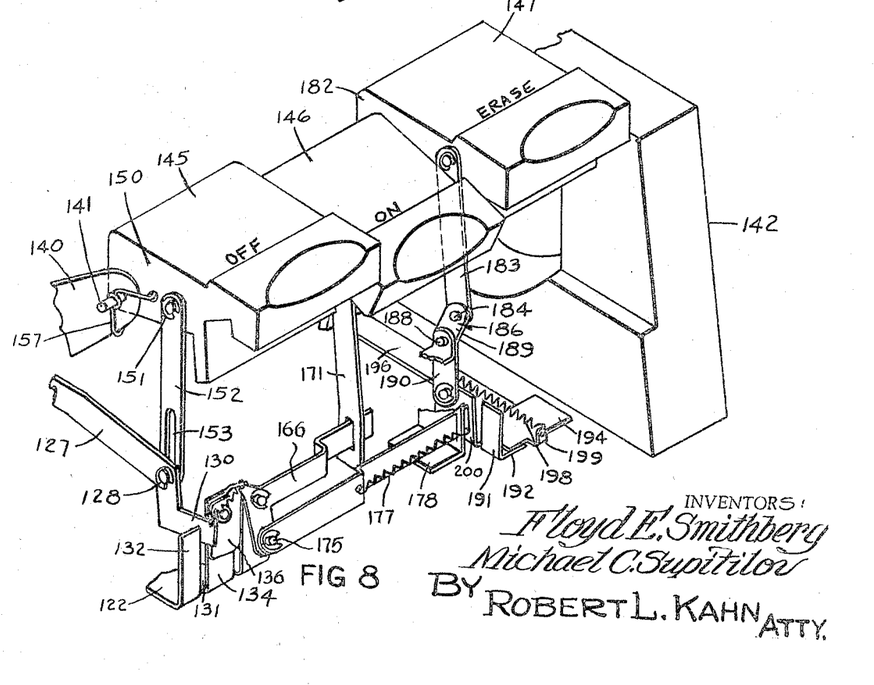
FIGURE 8 is a perspective view illustrating the push button controls with the ON button in the pressed position.

Pivotally secured to move about stud 17 on motor plate 15 are brackets 27 and 28. Between bracket 27 and end face 30 of bushing 19, the end face projecting beyond end face 31 of the hub, is E washer assembly 29. Bracket 28 is disposed against the smooth face of plate 15. Both brackets 27 and 28 are independently rockable about stud 17. Bracket 27 carries pin 33 rigidly secured thereto. Freely rotatable about pin 33 is idler wheel 34. Similarly, bracket 28 carries pin 36, upon which idler wheel 37 can freely rotate. Motor shaft 14 extends through a clearance hole in motor plate 15 into the annular region within pulley 20 between flange 24 and hub outer surface 25. The end portion of motor shaft 14 is used as a small driving member which cooperates with either of idlers 34 or 37. If idler 34 is active, the pulley is driven at hub outer surface 25 in reverse direction. If idler 37 is active, the pulley is driven at inner surface 24a of flange 24 in forward direction, it being understood that motor shaft 14 always turns in the same direction. The tolerances for the mountings of brackets 27 and 28 on stud 17 and idlers 34 and 37 on pins 33 and 36 are sufficient to permit the desired direction of travel of idlers 34 and 37 for clutch action to occur.

With the above arangement, the necessity for a reversible motor is eliminated. At the same time, the different speed ratios desirable for two directions of belt travel are easily obtained, and a desirable braking action from the motor shaft is also obtained. The angular relationship of brackets 27 and 28, as well as the relative diameters of the idlers, motor shaft 14, and pulley driven surfaces are inter-related so that rocking of bracket 27 or bracket 28 about stud 17 as a pivot functions to effect clutching and reversing actions as described. The idlers and pulley are maintained in position upon stationary supports by suitable washers 39, 40 and 41. These washers may be C or E washers and may have, if desired, smooth faced additional washers.

The means for rocking brackets 27 and 28 are illustrated in FIGURES 3 and 5 to 7 inclusive. Referring to bracket 27, this has angle portion 43 extending away from motor plate 15 and disposed on the end of the bracket which is clear of pulley 20. Rigidly secured to angle portion 43 by suitable means, such as rivets 44, is leaf spring 45 extending away from pulley 20 and terminating in forked portion 46. Leaf spring 45 is of steel or phosphor bronze or other material, either metal or nonmetal. Forked portion 46 of the leaf spring engages neck 47 of head 48 of nylon or other insulating material attached to and forming part of armature assembly 49. Armature assembly 49 is slidably disposed within solenoid 51 secured on extension 52 of motor plate 15. Solenoid 51 has a suitable magnetic structure 53 disposed at the two ends of the solenoid and along the side to improve the magnetic characteristics thereof. The solenoid is mounted for use in the machine in a direction so that armature 49 which is fairly loose in the solenoid can move perpendicular to the axis of stud 17. The arrangement of armature 49 is such that when solenoid 51 is not energized, armature 49 drops by gravity to its lowest position and pulls leaf spring 45 with it. Forked end 46 of the leaf spring is large enough so that it overlies the end of the solenoid and prevents the armature assembly from dropping too low. Thus armature assembly 49 is biased by gravity to a down position causing bracket 27 to move idler 34 clear of motor drive shaft 14. When solenoid 51 is energized, the armature assembly is attracted to the up position and causes idler 34 to engage motor shaft 14 and pulley surface 25.

As will be apparent later on, in connection with the descripiton of the companion means for operating bracket 28, the upward movement of armature 49 makes it impossible for bracket 28 to be maintained in a position for driving idler 37.

A generally similar arrangement is provided for rocking bracket 28. Thus bracket 28 has angle portion 43', upon which is secured leaf spring 45' generally similar to leaf spring 45. Leaf spring 45' has forked end portion 46' which engages neck 47' of armature portion 49'. In this particular instance, no nylon cap is required, as is true of head 48 previously described. Armature 49' carries at the bottom thereof cap 54 of nylon or other insulating material. Cap 54 has flanged end 55 for limiting the movement of the armature assembly into solenoid 51'. Solenoid 51' is secured on arm 52' of motor plate 15 and is so oriented that the armature movement is generally perpendicular to the axis of stud 17.

The two solenoids are arranged so that their axes are at an angle and intersect at point 56, the angle between the two axes being determined by the geometry involving the location of idlers 34 and 37. The arrangement is such that upon energization of winding 51', armature assembly 49' will be pulled downwardly and cause idler 37 to engage motor shaft 14 and inside of flange 24.

The dimensions of the various pieces including cap 54 and cap 48 are such that it is impossible for the two armatures to be in their attracted position at the same time. Thus if armature 49 is in the up position (attracted), then armature 49' will have to be in the up (deenergized) position and vice versa.

Armature assembly 49' for the top solenoid is maintained or biased to an up position by contact leaf spring 60 (FIGURE 3) forming part of a switch construction, generally indicated by 61. For the bottom solenoid, spring 63 is provided and aids in biasing armature 49 downwardly and is part of a switch structure, generally indicated by 65. Switches 61 and 65 are used not only for biasing purposes, but also cooperative with the solenoids for effecting electrical switching to change the operating conditions of the machine. As will be more fully explained later, switch 65 tends to short circuit any resistance in the motor circuit which may be used for speed control and permits maximum motor speed during reverse. Switch 61 is used to energize circuits for recording or reproducing when the belt is being driven in forward direction.

RECORD BELT DRIVE MEANS
(FIGS. 2, 3, 12, 13 AND 14)

The power output of pulley 20 is at hub sleeve 22 of the pulley. Cooperating with hub sleeve 22 is belt 70 which extends to pulley 71 for driving a record belt. Pulley 71 is rigidly secured to shaft 73 carrying record belt driver mandrel 74. Driver mandrel 74 has flange 75 at the end thereof adjacent to pulley 71, this end of the driver mandrel being the inner end. Shaft 73 is journaled in arms 76 and 77, the latter being rigidly attached to casting 80 anchored to the machine base. Casting 80 extends away from mandrel 74 toward what may be designated as the front of the dictating machine and has forked arm 81 whose end extends into slot 83 of cap 85 rigidly secured to shaft 87 carrying record belt follower mandrel 90. Shaft 87 is journaled in arms 91 and 92 of support bracket 93 and the follower mandrel together with support bracket 93 is movable in a plane parallel to the base of the machine on parallel guide rods 93a and 93b. Thus follower mandrel 90 can be moved toward or away from driver mandrel 74 in order to permit belt removal or tightening on the machine. Mandrel 90 is provided with flange 91 at the inner end thereof.

Follower mandrel 90 has a normal position when a belt is tight. Normally mandrel 90 is freely movable toward or away from driver mandrel 74. The control of follower mandrel 90 is by the following means. Bracket 93 carries substantially at a central region thereof two clamping screws 100 and 101. These clamping screws pass through slot 102 in piece 103 pivotally secured at 104 to link 105. Link 105 has U-shaped portion 106 extending toward driver mandrel 74. U-shaped portion 106 of the link has hole 107 at the end thereof coupled to bias coil spring 108 whose other end is anchored to fixed pin 110 in casting 80 of the machine. Spring 108 should extend along the center line perpendicular to the axes of the two mandrels and halfway between the mandrel ends, when the two mandrels are in normal belt driving position. The lateral adjustment of part 103 along bracket 93 permits an adjustment of the direction of the force due to spring 108 and makes it possible to provide an accurate adjustment for controlling the tracking of the transducer upon the belt and action of the belt upon the mandrels.

Link 105 has pivoted thereto at 115 arm 116 having switch actuating end 117 and having wire finger 118 coupled thereto by threading the end of the wire finger into aperture 119 in arm 116. Wire finger 118 is hooked into arm 120 pivotally supported at 121 on U-shaped bracket 122 attached to base 10 of the machine. Arm 120 carries spring finger 124 extending rearwardly of the machine and adapted to raise wire member 125, to be described in further detail later. It might be observed that wire member 125 controls the elevation of the transducer and marker combination so that when no belt is present, the transducer and marker assembly can be elevated to an inoperative position.

PUSH BUTTON CONTROLS
(FIGS. 1, 8, 9, 10, 11 AND 12)

Figure 11:
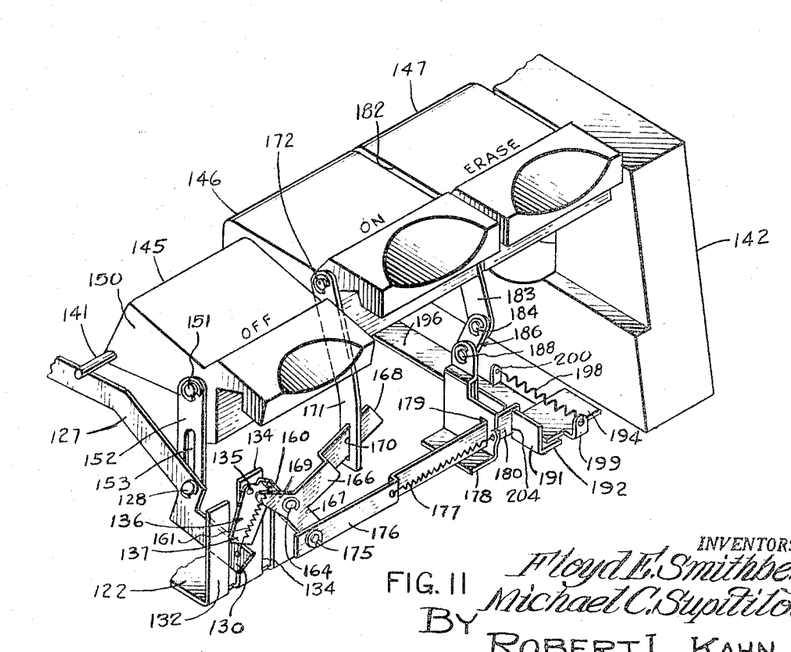
FIGURE 11 is a view of the push button mechanism with the OFF button down.
Figure 12:
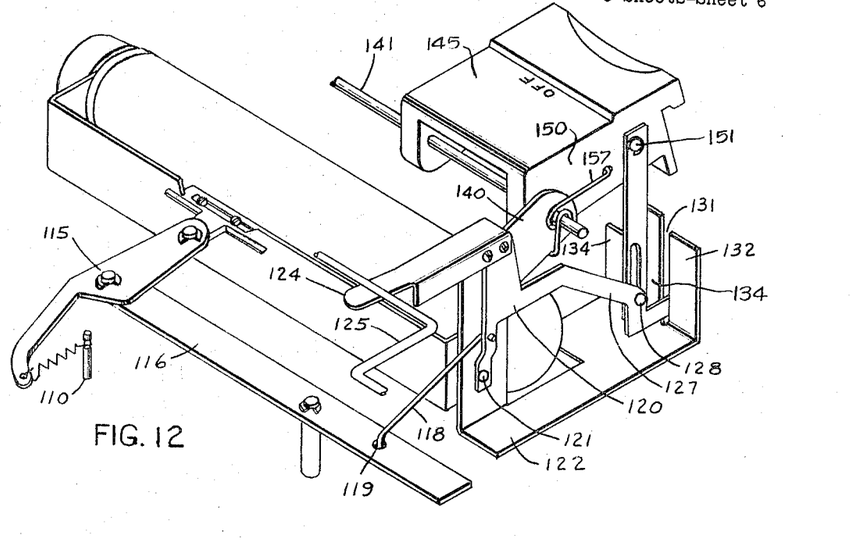
FIGURE 12 is a perspective view illustrating certain mechanical details relating to the OFF button control.
Figure 13:
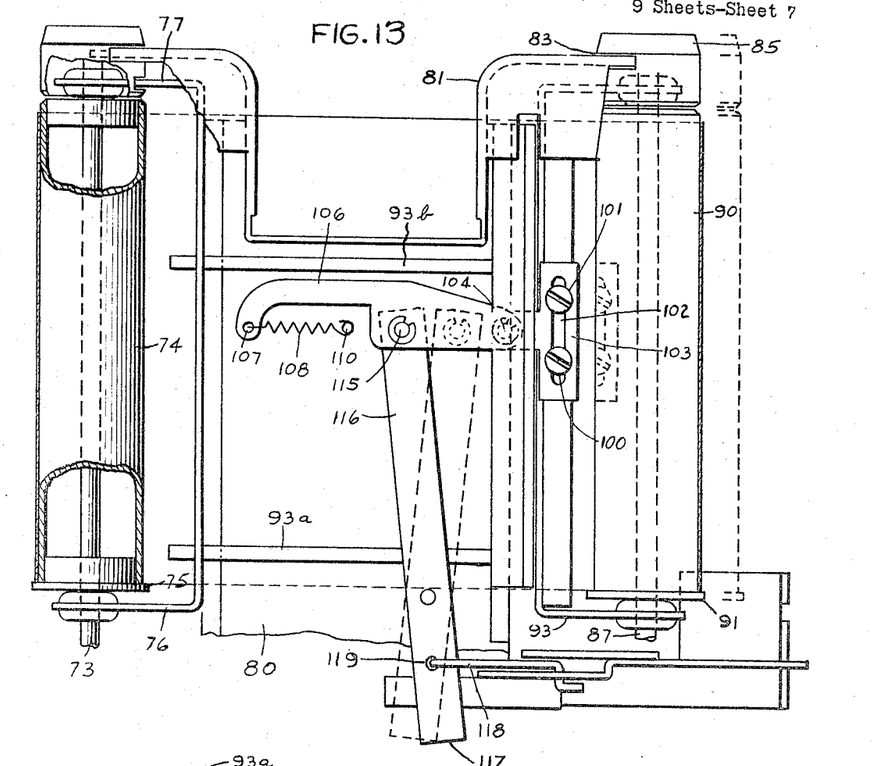
FIGURES 13 and 14 are plan views of the means for moving the driven mandrel for belt tension control.
Figure 14:
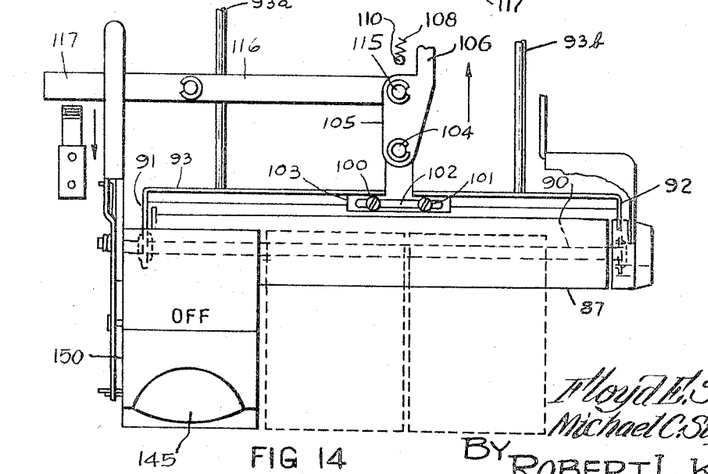
Figure 15:
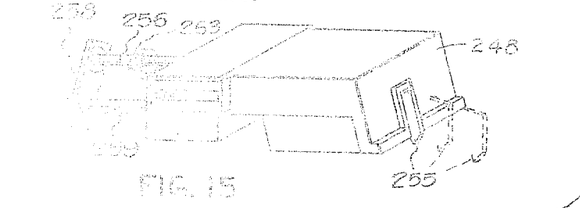
FIGURE 15 is a perspective view of the marker head and mounting.
Figure 16:
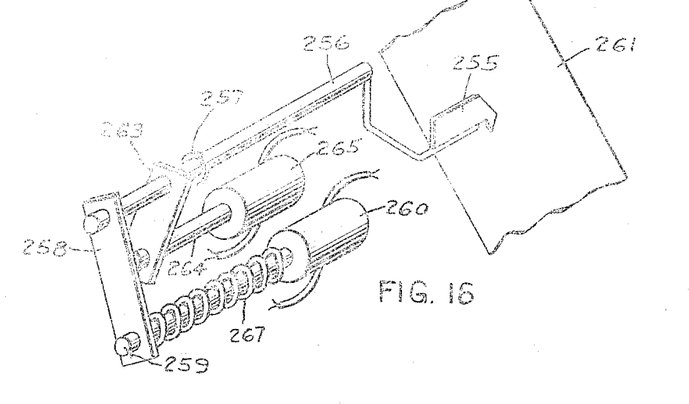
FIGURE 16 is a perspective view of the mechanical details of the marker mechanism.
Figures 17, 18:
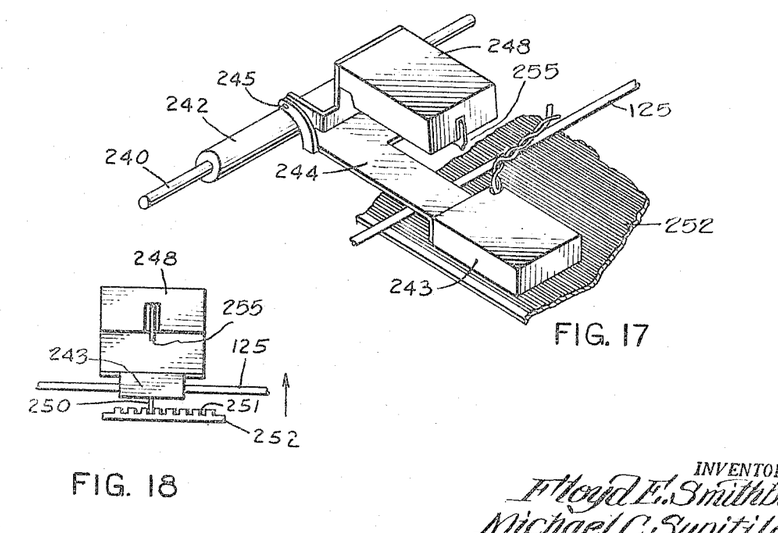
FIGURE 17 is a perspective view showing the transducer and marker heads and their mountings.
FIGURE 18 is a front elevation showing the transducer and marker heads.

Arm 120 also includes as a part thereof forwardly extending finger 127 carying pin 128 and terminating in end portion 130. End portion 130 works in slot 131 of part 132 of bracket 122. Part 132 of the bracket has portion 134 to the right of slot 131 as seen from the front of the machine and this portion 134 carries pivot pin 135, upon which is mounted detent plate 136. Detent plate 136 has body portion 137 which will lock finger portion 130 when this finger portion 130 has slipped past body 137 in the downward travel of finger portion 130 in slot 131, this occurring when an operator pushes the ON button. Normally, tension spring 108 acts to pull bracket 93 and mandrel 90 away from driving mandrel 74 and to bias portion 130 to an upward position. This upward bias on portion 130 is accomplished by part 117 of arm 116 being urged rearwardly to pull wire finger 118 rearwardly and rock arm 120 counterclockwise as seen in FIGS. 12 and 13. The downward postion of portion 130 as seen in FIGURE 11 corresponds to the belt untensioned mandrel position. This is obtained by the following means.

Rigidly secured to a portion of bracket 122 is arm 140 (FIGURE 12) in which is disposed pivot rod 141. Pivot rod 141 extends to the side of the machine and is supported in massive side portion 142 (FIGURES 10 and 11) carried by the base and extending upwardly along the side of the machine. Pivotally suported on rod 141 are three push buttons 145, 146 and 147, marked respectively "OFF", "ON" and "ERASE." These push buttons are preferably of plastic, or any other suitable material, and may be shaped to accommodate the fingers of a person.

Push button 145 (FIGURES 8 and 10) has at side 150 pivot pin 151 extending therefrom. Rockably supported on pivot pin 151 is rod 152 normally extending downwardly therefrom and having elongated slot 153 extending toward the bottom of the rod. Pin 128 carried by finger 127 rides in slot 153. Push button 145 is biased to an up position by spring 157 secured to arm 140 at one end and to the push button at the other end. Elongated slot 153 permits push button 145 to be depressed idly for a limited distance without doing anything, after which, rod 152 operates on pin 128 and forces finger 127 downwardly.

Referring now to detent plate 136 (FIGURE 11), this has laterally extending finger 160 to which is attached one end of tension coil spring 161, the other end of this coil spring being anchored to end 130 of arm 127. The arrangement is such that tensioned coil spring 161 biases detent plate 136 clockwise about pivot pin 135, as seen from the front.

Portion 134 of bracket 122 also carries pivot pin 164, upon which is pivotally secured bell crank 166 having arm portions 167 and 168 and finger 169. Finger 169 cooperates with laterally extending finger 160 of detent 136 and can rock detent 136 counterclockwise (as seen from the front) to permit finger 130 to unlock. Arm portion 168 extends laterally of the entire machine away from detent plate 136 and is laterally offset and passes through slot 170 of strip 171 pivotally secured at pin 172 on button 146. Depressing button 146 will thus cause bell crank 166 to rock and rock detent plate 136 counterclockwise to free portion 130 so that it can move upwardly in slot 131.

Arm 167 of bell crank 166 is pivotally secured at 175 to rod 176 having one end of tension coil spring 177 attached thereto with the other end of coil spring 177 attached to fixed guide plate 178 secured to the base. Guide plate 178 has slot 179 through which rod 176 passes, rod 176 having end portion 180 always extending beyond guide plate 178. Coil spring 177 biases rod 176 to the right, as seen from the front of the machine, and thus aids coil spring 161 in biasing detent plate 136. Rod 176 is long enought to permit guide plate 178 to be positioned below push button 147. Push button 147 (FIGURES 8 and 9) carries pivotally secured thereto at side 182 in a manner similar to push buttons 145 and 146, rod 183 extending downwardly and having the lower end pivotally secured at 184 to bell crank 186 pivoted at 188 and having arms 189 and 190 respectively. Pivot 188 is carried by guide plate 178. Bell crank 186 has depending arm 190 pivotally secured to angle 191 having portion 192 resting upon the base of the machine and maintained in position by plate 194 rigidly secured to the base and adapted to guide portion 192 to permit the same to slide in a direction between the front and rear of the machine. Angle 191 forms part of push rod 196 extending along the base of the machine rearwardly and used for operating erasing means, to be described later. Angle 191 and push rod 196 are biased normally to a forward position by spring 198 having one end attached to pin 199 on plate 194 and the other end attached to ear 200 carried by push rod 196. Push rod 196 has cross piece 202 extending laterally and rearwardly disposed of guide plate 178. Cross piece 202 cooperates with the rear edge of the bottom portion of guide plate 178 to prevent angle 191 and push rod 196 from being pulled forwardly beyond a predetermined point.

Angle 191 is normally locked to its biased position, which is its front or outer position, by portion 180 extending through slot 204 in angle 191. Portion 180, which is part of rod 176, can be moved left, as seen from the front of the machine, to remove portion 180 from the slot in angle 191, this occurring upon downward movement of ON button 146. The ERASE button cannot be moved downwardly for erasing action unless the ON button is simultaneously pressed downwardly to unlock the ERASE button linkage. This erase interlock is provided to reduce the possibilty of erasing by accident.

Figure 9:
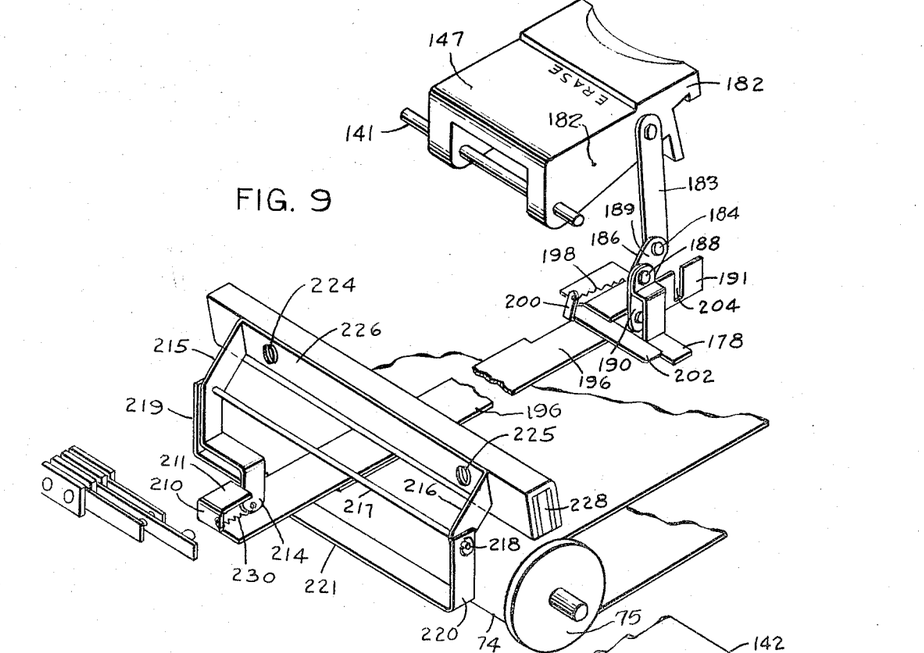
FIGURE 9 is a perspective detail of the parts of the mechanism relating to the erase action.
Figure 10:
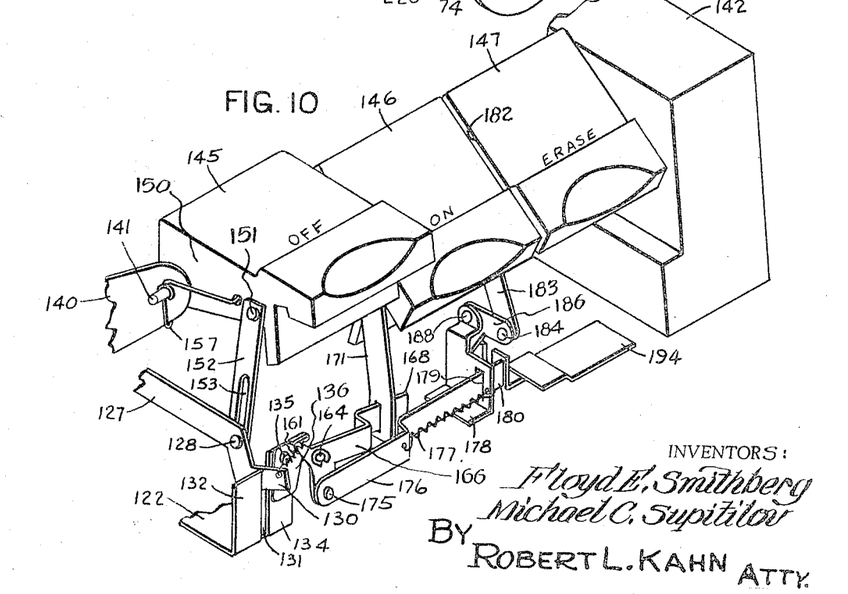
FIGURE 10 is a perspective view of the push button controls showing the ON and ERASE buttons in down position.

ERASE MECHANISM (FIGURES 9 AND 10)

As previously pointed out, the erase means is operated by pressing ERASE button 147 after or simultaneously with downward movement of ON button 146 This downward movement of ON button 146 unlocks the linkage controlling the ERASE button and permits the ERASE button to be fully depressed Push rod 196 extends rearwardly of the machine and has rear end portion 210 bent upwardly and forwardly to provide finger 211 Finger 211, when moved forwardly of the machine, engages laterally offset finger 214 carried by arm 215. Arm 215 and companion arm 216 are pivotally supported on rod 217 carried by arms 219 and 220 of U-shaped support member 221 rigidly anchored to the base. Supported by bolts 224 and 225 upon strip 226 carrying arms 215 and 216 is a permanent magnet erase assembly, generally indicated by 228. This assembly may be similar to the permanent magnet erase assembly disclosed in the prior patent previously identified. Any other permanent magnet erase assembly may be used if desired.

The support for the erase assembly assembly is disposed rearwardly of mandrel 74 and so designed that rearward movement of push rod 196 will cause the permanent magnet assembly to be moved downwardly toward the belt at or near the top of mandrel 74. Spring 230 is stretched between part of finger 210 and finger 214 to maintain the fingers in contact. The entire erase system is biased by springs to move ERASE button 147 up to a non-erase position. Thus when ERASE button 147 is released, this button will rise and the erase portion of the mechanism will assume normally inoperative position.

TRANSDUCER AND MARKER ASSEMBLY AND MOUNTING (FIGS. 2, 15, 16, 17 AND 18)

Referring to wire member 125, this extends across the machine for substantially the full length of the mandrels. Wire member 125 has portion 235 which is laterally offset toward the rear of the machine and this portion, together with portion 125 of the wire, has arms 236 and 237 whose ends are looped around transverse transducer guide rod 240. Guide rod 240 is supported at the ends by upstanding portions of the general base structure of the machine. Guide rod 240 slidingly supports the carriage for the transducer and marker assembly. This guide rod support for the entire carriage assembly consisting of the transducer and marker assembly may be similar to the corresponding structure disclosed in the patent previously identified.

The transducer and marker assembly is carried by sleeve 242 slidable along guide rod 240. Transducer head 243 is carried by arm 244 supported at point 245, spaced along the length of sleeve 242. Arm 244 is positioned over wire member 125 and can be raised by manipulating wire member 125. Disposed above arm 244 is marker assembly 248 pivotally supported by fingers at point 245. The marker assembly can be lowered with respect to the transducer head and the transducer head will be elevated when the marker assembly is raised. The transducer head may be of conventional construction and has lamination 250 extending downwardly for cooperation with the tracking groove 251 in record belt 252. It is understood that the record belt has a ferromagnetic layer in groove 251. It is possible to have lamination 250 ride the land or ridge between adjacent grooves if desired. In such case, non-magnetic guides will ride the grooves while the lamination will be positioned on the land.

Marker assembly 248 is adapted for remote control, and as is customary, is designed to make a short or long mark on a paper strip which will extend across the machine below the marker stylus. Marker assembly 248 includes marker stylus 255 carried by finger 256 extending rearwardly of the machine. Arm 256 carries shoulder piece 257 and the rear end of arm 256 is attached to drive block 258. Drive block 258 is attached to long drive plunger 259 which forms an armature for solenoid 260. When this solenoid is energized, block 258 is urged forwardly the maximum distance to move stylus 255 over paper strip 261 and make a long mark transversely of the length of the paper strip.

For providing a short mark, auxiliary drive block 263 rigidly attached to short drive plunger 264 is provided. Plunger 264 functions as the armature for short stroke solenoid 265. Auxiliary drive block 263 is slidable along arm 260 and is disposed between drive block 258 and shoulder piece 257. Thus when solenoid 265 only is energized, block 263 will be instrumental in driving stylus 255 for a short distance. For the long stylus stroke, both solenoids can be energized to start the stylus rapidly.

The stylus and plungers are biased to a normal off-position by coil spring 267 disposed around plunger 259. It is understood that solenoids 260 and 265 will be firmly anchored to the marker assembly housing base, with the plungers and drive blocks movable as illustrated. A guide for the forward end of arm 256 may be provided to prevent sagging.

Figure 19:
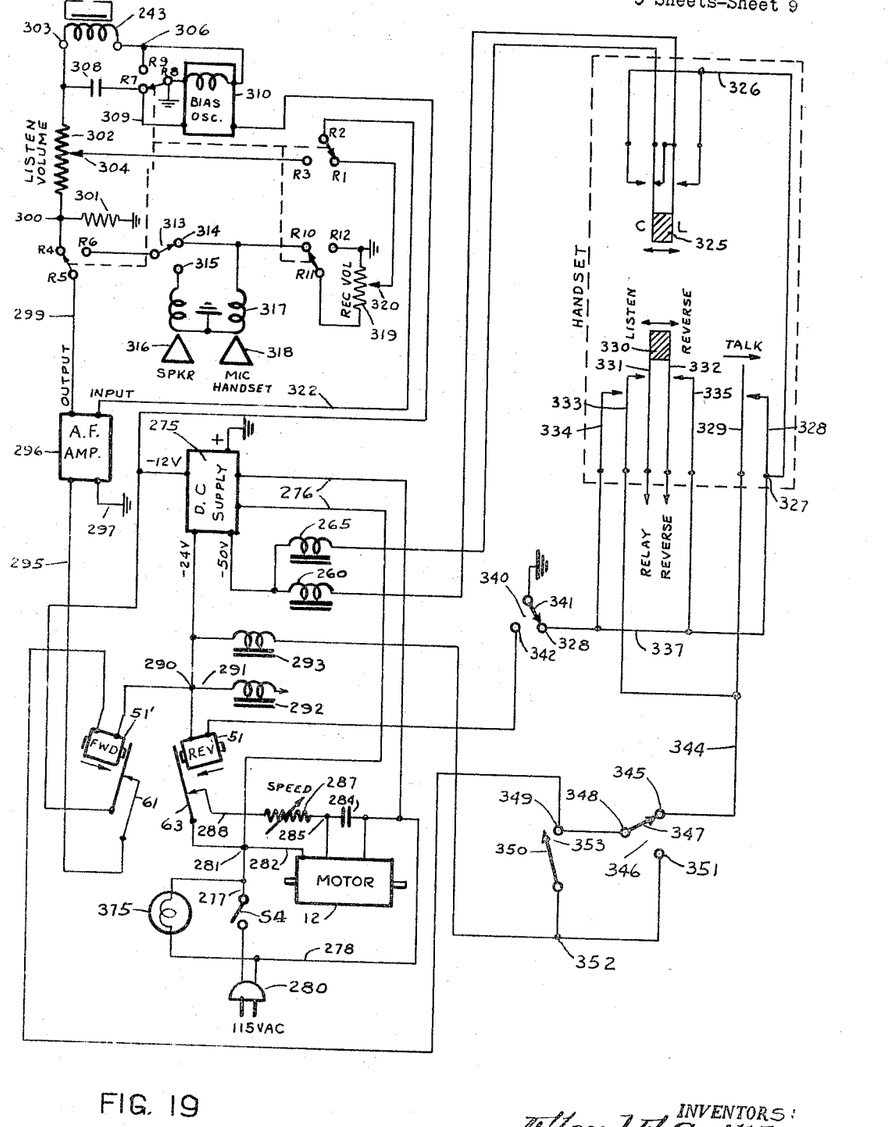
FIGURE 19 is a schematic wiring diagram illustrating the electrical circuitry of the machine embodying the present invention.

ELECTRICAL CIRCUITRY (FIG. 19)

A schematic diagram of the electrical circuits involved in the new machine is shown in FIGURE 19. The physical location of certain switches will be given by reference to the figures where the supporting part of the structure is disclosed. The circuit condition as shown in FIGURE 19 is for Record.

A D.C. power supply 275 has the positive terminal grounded and has three negative terminals as shown for providing current at 12, 24 and 50 volts. The exact potential is merely exemplary and the power supply is shown in block form. It is understood that power supply 275 in practice will be energized from leads 276 connected to supply wires 277 and 278 going through ON-OFF switch S4 and thence to plug 280 for connection to a conventional 115 volt power outlet. The actual design of a power supply is well known and it is understood that the power supply will supply filtered currents at the voltages stated. Wire 277 is connected to junction point 281 on wire 282. Wire 282 goes to one terminal of two-phase motor 12. Wire 278 is connected to another terminal of motor 12. Wire 278 is also connected to one terminal of phase splitting capacitor 284, the other terminal of which is connected to junction 285. Junction 285 is connected to the third terminal of motor 12. Junction 285 is also connected to one terminal of rheostat 287, the other terminal of which is connected by wire 288 to one terminal of normally closed switch 63 (FIG. 3). The other terminal of switch 63 is connected to wire 282. When switch 63 is open, motor 12 runs at full speed with rheostat 287 playing no part. This occurs when the motor is driving the record belt in reverse. When switch 63 is closed, rheostat 287 provides a potential which cooperates with the potential at the terminal of capacitor 284 to control the speed of motor 12. This occurs when motor 12 is driving the belt forwardly.

Reverse solenoid 51 has one terminal connected to junction point 290 which in turn is connected by wire 291 to the −24-volt terminal of power supply 275. Wire 291 is also connected to one terminal of relay winding 292 and one terminal of winding 293 for a buzzer or alarm. Wire 291 is also connected to one terminal of the winding of solenoid 51'. Switch 61, controlled by solenoid 51', has one terminal connected to the −12-volt supply line and has the other terminal connected by wire 295 to supply current at 12 volts D.C. to audio frequency amplifier 296. The other terminal 297 of this amplifier is grounded. Amplifier 296 is of the transistor type and can be energized from a 12-volt D.C. source. If amplifier 296 were provided with vacuum tubes, it is understood that the plate supply of such vacuum tubes could be controlled and the voltage would be greater.

Relay winding 292 controls relay contacts R1 to R12 inclusive. Considering amplifier 296, the output of this is fed by wire 299 to relay contact R5 which is a movable contact cooperating with contacts R4 and R6 respectively. Relay contact R4 is connected to junction point 300 which is connected to one terminal of load resistor 301, the other terminal of which is grounded. Junction point 300 is also connected to one terminal of Listen volume control 302, the other terminal of which is connected to junction point 303. Listen volume control 302 has movable contact 304 connected to relay contact R3. Junction point 303 is connected to one lead of the winding of transducer head 243. The other lead of this winding is connected to junction point 306 connected to relay contact R9. Junction point 303 is connected through capacitor 308 to relay contact R7. Capacitor 308 is large enough to pass bias oscillation frequencies of the order of about 40,000 c.p.s. but offers high impedance to audio frequencies. Relay contact R7 is connected by wire 309 to one terminal of bias oscillator 310. Another terminal of bias oscillator 310 is connected to grounded movable contact R8 of the relay which cooperates with contacts R7 and R9. Contact R9 and a third terminal of bias oscillator 310 are connected to junction 306. When movable contact R8 is on contact R9, the system is in Listen. The oscillator switching arrangement is conventional.

Relay contact R6 is connected to a switch having movable contact 313 (FIG. 2) cooperating with contacts 314 and 315. Contact 315 is connected to one terminal of speaker 316, the other terminal of which is grounded. Movable switch contact 313 is manually controlled and can remain in either switch position. As shown, movable contact 313 is closed against switch contact 314 which is connected to relay contact R10. Relay contact R10 is also connected to one terminal of winding 317 of a microphone-speaker 318 which will ordinarily be disposed in a handset such as disclosed in our patent referred to before. The other terminal of this winding 317 is grounded. Relay contact R10 is one of two stationary contacts, the other being R12, this latter contact being grounded. Between stationary contact R12 and movable contact R11 is connected Record volume control 319. Wiper 320 of this volume control is connected to stationary relay contact R1. Movable contact R2, cooperating with stationary contacts R1 and R3, is connected back by wire 322 to the input of audio frequency amplifier 296. The arrangement of the output and input connections for amplifier 296 is generally conventional and permits recording on the belt in the condition of the contacts as illustrated, the voice being applied to microphone handset 318. In the alternative relay position, reproduction would occur and if desired, speaker 316 can be used by operating switch S6.

Referring back to D.C. supply 275, the −50-volt output is connected to one terminal of each of windings 260 and 265 of the marker mechanism. The remaining terminal of each of these windings, marked respectively L and C, are connected to the contacts of the right-hand switch arrangement located in the dotted line rectangle marked "Handset." The handset referred to is similar to the handset in the patent previously identified. When insulating block 325 is moved up from normal, marker winding 265 is energized. When insulating block 325 is moved down from normal, marker winding 260 is energized.

The L and C leads can be connected to wire 326 going to junction 327 of the switch array on the left-hand side of the handset. Junction 327 is the terminal of fixed contact 328, against which movable contact 329 may close for Talk or Record.

Insulator block 330 operates directly on movable contacts 331 and 332. Movable contacts 331 and 332 are respectively connected to the relay and reverse connections for windings 292 and 51 respectively. Movable contact 331 cooperates with contact 333 in the Listen position of the switch and contact 333 in turn finally closes against contact 334. Similarly movable contact 332 closes against contact 335 in the reverse position of the switch. Contacts 334 and 335 are connected together to wire 337 which is also connected to contact 328. Wire 337 is connected to switch contact 338 of switch 340 (FIG. 9) having grounded movable contact 341. Switch 340 has fixed contact 342 connected to the lower lead of the winding of reverse solenoid 51. Switch 340 is part of the erase mechanism.

Figure 2:
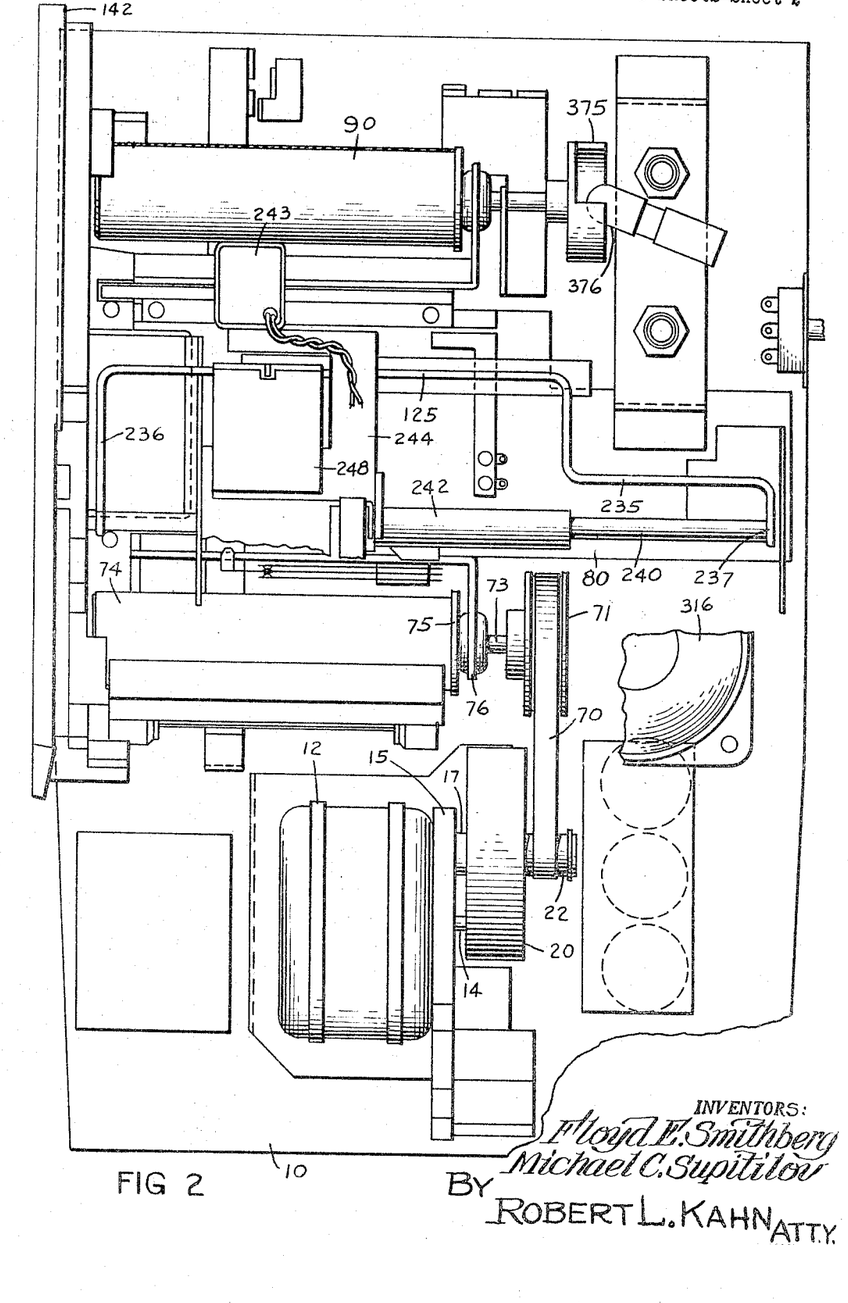
FIGURE 2 is a top plan view with the cover removed of the machine illustrated in FIGURE 1.

Contacts 329 and 333 are connected by wire 344 to switch contact 345 of switch 346 (FIG. 2). Switch 346 has movable contact 347 connected to junction point 348 which in turn is connected to switch contact 349 of switch 350 (FIG. 2). Switch 346 has its other switch contact 351 connected to junction point 352 of switch 350. Junction point 352 has movable contact 353 which is normally open but which can close against fixed contact 349. Fixed contact 349 is connected to the remaining lead, this being the top lead of forward solenoid 51′. Junction point 352 is connected to the bottom lead of the buzzer winding 293.

Insofar as the electrical system alone is concerned, when the various switches are in Off position, handset contacts 328 and 329 will be normally open. Motor 12 will be running at the speed determined by the setting of rheostat 287 but the record belt will not be moved. Assuming that the record belt is in position and everything is in order, movable contact 329 is moved down against fixed contact 328. This will close the circuit for forward solenoid 51′. The record belt will be driven forwardly and at the same time amplifier 296 will be energized. The output from handset microphone 318 will be fed from Record volume control 319 to the input of amplifier 296. The output will be mixed in transducer 243 with the oscillator output for recording magnetically on the belt.

For listening, insulating block 330 of the handset is moved upwardly. Switches 346 and 350 are concerned with the presence of the belt and the position of the transducer head so that under normal listening conditions, these switches will remain in the positions shown. The result is that the initial closure of contact 331 against contacts 333 and 334 will energize the winding of relay 292 and solenoid 51′. Relay contacts R1 to R12 inclusive will be affected so that the movable contacts are changed to the Listen position. Thus amplifier 296 will be reversed so that the output will be connected to winding 317 of the handset speaker or, if desired, to the winding of speaker 316. At the same time, bias oscillator 310 will be short circuited and the output of transducer head 243 will be fed to the input of the amplifier.

The closing of contact 333 against contact 334 will complete the circuit for forward solenoid 51′. This will not only drive the belt forwardly, but will also energize amplifier 296.

Downward movement of insulating block 330 closes the winding of reverse solenoid 51. At the same time, switch 63 is opened and causes the motor to run the full speed.

In the event that the transducer has reached the end of the belt, switch 346 (FIG. 2) is operated to move movable contact 347 against fixed contact 351. This results in the buzzer operating if insulating block 330 is moved to the Listen position or in the event that the Talk switch is moved to close contact 329 against contact 328.

In the event that there is no belt in the machine, switch 350 (FIG. 2) is operated to move contact 353 away from its normally open position to close against stationary contact 349. The buzzer will now sound in the event that one attempts to either talk or listen.

If at any time during Record or Listen, the operator desires to use the marker, insulating block 325 is moved either down or up to make a long or short mark on the paper.

Figure 1:
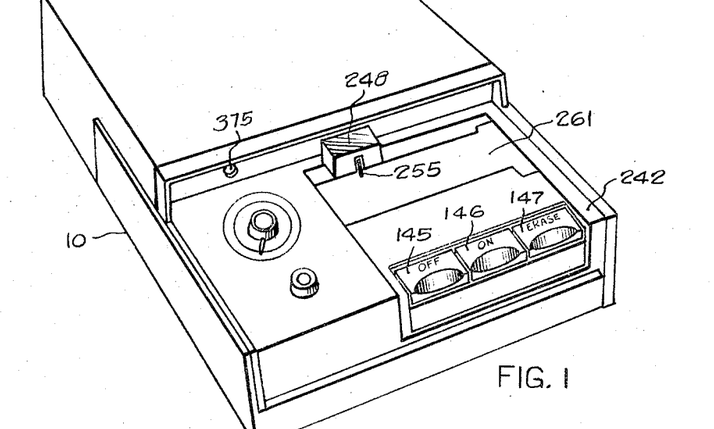
FIGURE 1 is a perspective view of a machine embodying the present invention.

In order to apprise a user of the machine when the record belt is moving, a light means is provided which blinks with movement of the follower mandrel. This indicating means is disclosed and claimed in the copending application of Robert E. Schroeder et al., Serial No. 104,416, now U.S. Patent 3,097,907, filed April 20, 1961, and assigned to the same assignee as the present application. Briefly, this blinking means comprises slotted member 375 carried by the follower mandrel shaft, cooperating with lamp 376 which is energized when switch S-4 is closed to energize the machine. Lamp 376 is within the hollow of slotted member 375. When member 375 is rotated, the light from lamp 376 is blinked and this may be visible through jewel 377 in the machine housing (FIGURE 1).

What is claimed is:

1. In a magnetic recording and reproducing machine for use with pre-grooved endless belts, the combination of a pair of cylindrical, laterally offset driver and follower mandrels having smooth surfaces upon which a belt bears, fixed means for supporting said driver mandrel for rotation about its axis, said driver mandrel having an inner end and an outer end, said driver mandrel supporting means being disposed to accommodate the endwise replacement of a record belt from said other mandrel end, U shaped member for supporting said follower mandrel for rotation about its axis, bias applying means coupled to said follower mandrel support means, said bias applying means comprising a part coupled to said "U" shaped member at a central region thereof and being adjustable along a line parallel to the length of said mandrel and a link pivotally secured to said part and extending laterally toward the driver mandrel and spring means cooperating with the free end of said link for biasing said follower mandrel away from said driver mandrel, said bias applying means lying within the space between the unsupported portions of the record belt extending between the two mandrel surfaces so that said record belt can be replaced on the two mandrels, a coupling adjustment permitting an accurate adjustment of the effective line of biasing force to dispose the axis of the follower mandrel slightly out of parallelism with the axis of the driver mandrel, one end of the driver mandrel normally being somewhat closer to the corresponding one end of the follower mandrel, manual means for moving the follower mandrel against its bias toward the driver mandrel to permit belt replacement, power means coupled to said one end of said driver mandrel for rotating said mandrel to drive said belt by friction and cause said follower mandrel to rotate, a flange at the one end of said driver mandrel and at the corresponding one end of said follower mandrel for limiting the tendency of said record belt to travel toward said one end of each mandrel, due to lack of exact parallelism of the mandrel axes, a transducer for cooperation with said pre-grooved record belt, and means for supporting said transducer to be freely movable laterally of said belt for cooperation therewith.

2. The combination according to claim 1 wherein said link has one end of a lever pivotally secured thereto, said lever extending between the two mandrels in a general direction away from the other mandrel ends and signal means controlled by said lever for indicating the absence of a belt when said driver mandrel is rotating, said lever being movable for actuating said signal means when the follower mandrel is free to move in response to its bias toward its extreme position away from the driver mandrel, a record belt normally preventing such extreme movement on the part of said follower mandrel and the belt being tensioned by such bias.

References Cited by the Examiner

UNITED STATES PATENTS

| | | | |
|---|---|---|---|
| 2,914,957 | 12/1959 | Johnson | 198—202 X |
| 2,951,127 | 8/1960 | Pierson et al. | 179—100.2 |
| 3,091,668 | 5/1963 | Trost | 179—100.2 |
| 3,118,314 | 1/1964 | Schuster | 198—202 X |

BERNARD KONICK, *Primary Examiner.*

V. P. CANNEY, *Assistant Examiner.*